United States Patent
Venu et al.

(10) Patent No.: US 11,687,890 B2
(45) Date of Patent: Jun. 27, 2023

(54) CARD READER BASED PAYMENT TRANSACTIONS FROM A WEB BROWSER

(71) Applicant: Intuit Inc., Mountain View, CA (US)

(72) Inventors: Aravinth Venu, Fremont, CA (US); Pilana Godakandage Hashan Dinushka Godakanda, East Palo Alto, CA (US)

(73) Assignee: Intuit Inc., Mountain View, CA (US)

( * ) Notice: Subject to any disclaimer, the term of this patent is extended or adjusted under 35 U.S.C. 154(b) by 207 days.

(21) Appl. No.: 17/003,526

(22) Filed: Aug. 26, 2020

(65) Prior Publication Data

US 2022/0067677 A1    Mar. 3, 2022

(51) Int. Cl.
| | |
|---|---|
| *G06F 9/445* | (2018.01) |
| *G06K 7/00* | (2006.01) |
| *G06K 7/08* | (2006.01) |
| *G06K 7/10* | (2006.01) |
| *G06Q 20/08* | (2012.01) |
| *G06Q 20/32* | (2012.01) |
| *G06Q 20/34* | (2012.01) |
| *G06Q 20/40* | (2012.01) |

(Continued)

(52) U.S. Cl.
CPC ............ *G06Q 20/085* (2013.01); *G06F 9/445* (2013.01); *G06K 7/0021* (2013.01); *G06K 7/087* (2013.01); *G06K 7/10366* (2013.01); *G06Q 20/326* (2020.05); *G06Q 20/34* (2013.01); *G06Q 20/40* (2013.01); *G06Q 20/42* (2013.01); *H04M 1/72484* (2021.01); *G06Q 40/02* (2013.01); *H04W 80/12* (2013.01)

(58) Field of Classification Search
CPC ................................................ G06Q 20/085
See application file for complete search history.

(56) References Cited

U.S. PATENT DOCUMENTS

| | | |
|---|---|---|
| 9,633,344 B2 | 4/2017 | Nathanel et al. |
| 10,810,592 B1 | 10/2020 | Omojola et al. |

(Continued)

FOREIGN PATENT DOCUMENTS

EP    3349162 A1    7/2018

OTHER PUBLICATIONS

Okoshi, et al., "Real-World Product Deployment of Adaptive Push Notification Scheduling on Smartphones," in Applied Data Science Track Paper (Year: 2019).*

(Continued)

*Primary Examiner* — Mike Anderson
*Assistant Examiner* — Brandon M Duck
(74) *Attorney, Agent, or Firm* — Paradice & Li LLP

(57) ABSTRACT

This disclosure relates to systems and methods for processing electronic payments for customer purchases. In some implementations, a mobile computing device receives a payment request identifying a sales transaction between a merchant and a customer. The payment request indicates a purchase amount owed by the customer to the merchant, and carries a set of instructions. The mobile computing device activates a card reader based at least in part on the set of instructions, receives customer authorization for electronic payment of the purchase amount, instructs the card reader to process a credit card for the purchase amount based on receiving the customer authorization, and receives confirmation of payment of the purchase amount from the card reader.

18 Claims, 8 Drawing Sheets

(51) Int. Cl.
  *G06Q 20/42* (2012.01)
  *H04M 1/725* (2021.01)
  *H04M 1/72484* (2021.01)
  *G06Q 40/02* (2023.01)
  *H04W 80/12* (2009.01)

(56) References Cited

U.S. PATENT DOCUMENTS

| | | | |
|---|---|---|---|
| 2008/0059375 A1 | 3/2008 | Abifaker | |
| 2011/0161229 A1 | 6/2011 | Mastrangelo et al. | |
| 2014/0207682 A1 | 7/2014 | Wolfond et al. | |
| 2014/0372320 A1 | 12/2014 | Goldfarb et al. | |
| 2015/0278788 A1* | 10/2015 | Manuel | G06Q 20/202 |
| 2015/0339656 A1 | 11/2015 | Wilson et al. | |
| 2016/0275474 A1* | 9/2016 | Kim | G06Q 20/20 |
| 2019/0303938 A1 | 10/2019 | Sanchez-Llorens et al. | |
| 2020/0349598 A1* | 12/2020 | Shaffer | H04L 63/0884 |
| 2020/0396221 A1* | 12/2020 | Shaffer | H04L 63/0884 |

OTHER PUBLICATIONS

International Search Report and Written Opinion, dated Oct. 11, 2021, for International Application PCT/US2021/038719.
International Search Report and Written Opinion, dated Oct. 11, 2021, for International Application PCT/US2021/0387555.
Venu et al., "Card Reader Based Payment Transactions From a Web Browser," U.S. Appl. No. 17/003,435, filed Aug. 26, 2020.
Yan et al., "Enhancing E-Commere Processes with Alerts and Web Services: A Case Study on Online Credit Card Payment Notification," Proceedings of the Sixth International Conference on Machine Learning and Cybernetics, Hong Kong, Aug. 19-22, 2007, IEEE, pp. 3831-3837 (Year: 2007).

\* cited by examiner

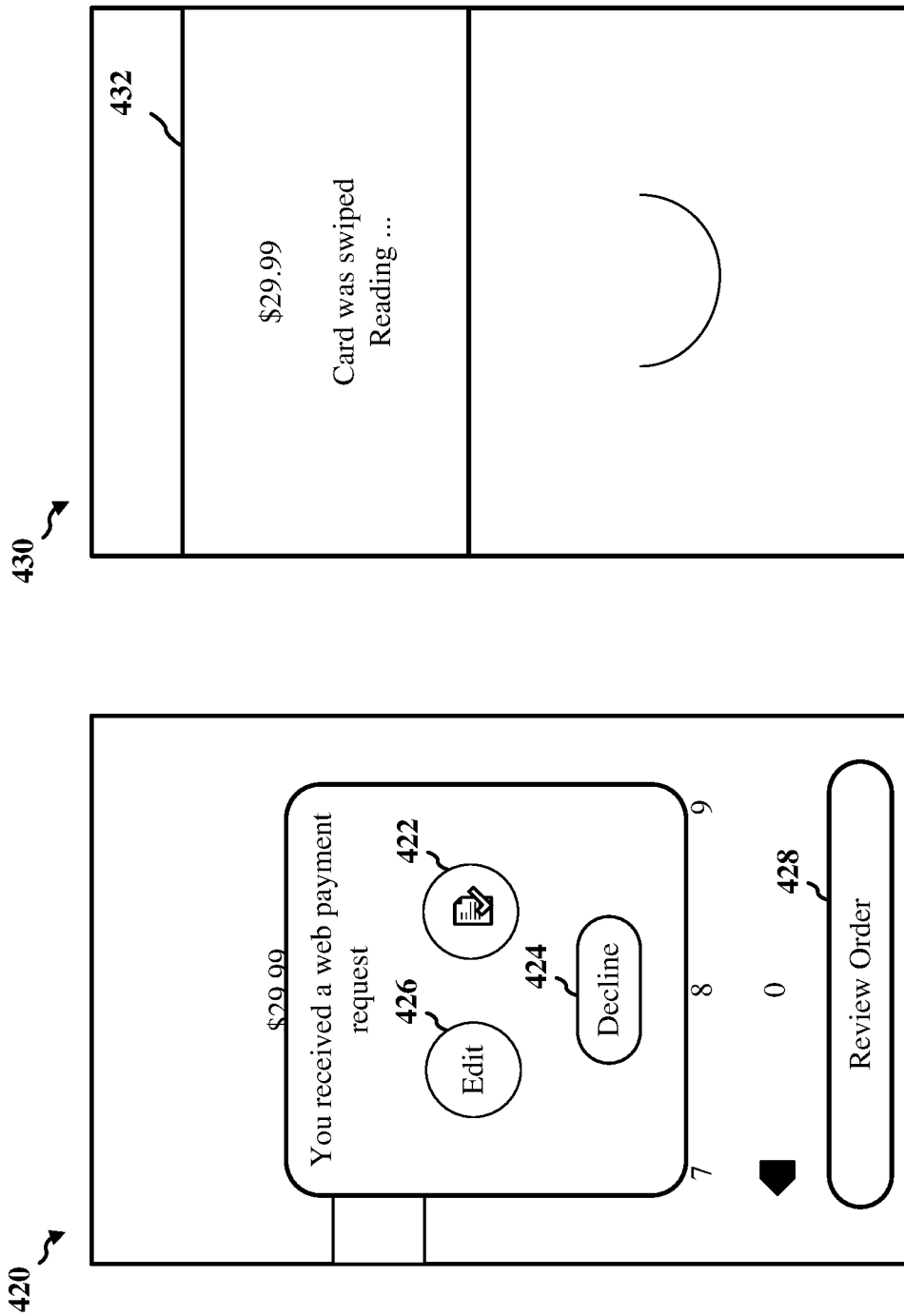

CARD READER BASED PAYMENT TRANSACTIONS FROM A WEB BROWSER

TECHNICAL FIELD

This disclosure relates generally to electronic payments, and more specifically, to authorizing electronic payments using a mobile computing device.

DESCRIPTION OF RELATED ART

Many merchants and small businesses outsource their payment processing operations to an electronic payment service to reduce overhead and increase operational efficiencies. These electronic payment services can be used for both online purchases and purchases made in traditional brick-and-mortar stores. For example, when a customer purchases goods in a brick-and-mortar store, the merchant may enter the purchase information into a point-of-sale (POS) terminal, which provides the purchase information to an associated card reader connected to the POS terminal. The card reader obtains credit card account information of the customer (such as by swiping the customer's credit card), and sends the purchase amount and the credit card account information to the electronic payment service for processing. Upon completion of the credit card transaction, the electronic payment service sends a payment confirmation to the card reader, which in turn sends the payment confirmation to the merchant POS terminal.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method of processing transactions. The method can be performed by one or more processors of a mobile computing device, and can include receiving a payment request identifying a sales transaction between a merchant and a customer, the payment request indicating a purchase amount owed by the customer to the merchant and carrying a set of instructions; activating a card reader based at least in part on the received set of instructions; receiving customer authorization for electronic payment of the purchase amount; instructing the card reader to process a credit card for the purchase amount based on receiving the customer authorization; and receiving confirmation of payment of the purchase amount from the card reader.

In some implementations, the payment request can be received from a payment processing system associated with the merchant, and the method can also include sending the payment confirmation to the payment processing system. The set of instructions can be carried in a push notification configured to launch a mobile payment application residing on the mobile computing device. In some instances, the card reader can be activated by executing the mobile payment application using one or more processors of the mobile computing device, and transmitting an activation signal and the payment amount to the card reader using one or more transceivers of the mobile computing device. In some other instances, the method can also include prompting the customer to insert the credit card into the card reader by presenting an alert or notification on a touch-sensitive display of the mobile computing device.

In some implementations, receiving the customer authorization can include presenting a notification of the purchase amount to the customer on a touch-sensitive display of the mobile computing device, and receiving customer input indicating acceptance of the purchase amount via the touch-sensitive display. The notification can include one or more of a selectable icon to accept the purchase amount, a selectable icon to decline the purchase amount, or a selectable icon to edit the purchase amount. In some instances, the method can also include instructing the card reader to not process the credit card based on a customer selection or interaction with the selectable icon to decline the purchase amount. In some other instances, the method can also include instructing the card reader to modify the purchase amount based on a customer selection or interaction with the selectable icon to edit the purchase amount.

Another innovative aspect of the subject matter described in this disclosure can be implemented in a mobile computing device. The mobile computing device can include a touch-sensitive display, one or more transceivers, one or more processors coupled to the one or more transceivers and the touch-sensitive display, and a memory coupled to the one or more processors and the touch-sensitive display. The memory can store instructions that, when executed by the one or more processors, cause the mobile computing device to receive a payment request identifying a sales transaction between a merchant and a customer, the payment request indicating a purchase amount owed by the customer to the merchant and carrying a set of instructions; activate a card reader based at least in part on the received set of instructions; receive customer authorization for electronic payment of the purchase amount; instruct the card reader to process a credit card for the purchase amount based on receiving the customer authorization; and receive confirmation of payment of the purchase amount from the card reader.

In some implementations, the payment request can be received from a payment processing system associated with the merchant, and execution of the instructions can also cause the mobile computing device to send the payment confirmation to the payment processing system. The set of instructions can be carried in a push notification configured to launch a mobile payment application residing on the mobile computing device. In some instances, the card reader can be activated by executing the mobile payment application using one or more processors of the mobile computing device, and transmitting an activation signal and the payment amount to the card reader. In some other instances, execution of the instructions can also cause the mobile computing device to prompt the customer to insert the credit card into the card reader by presenting an alert or notification on a touch-sensitive display of the mobile computing device.

In some implementations, the mobile computing device can receive the customer authorization by presenting a notification of the purchase amount to the customer on a touch-sensitive display of the mobile computing device, and receiving customer input indicating acceptance of the purchase amount via the touch-sensitive display. The notification can include one or more of a selectable icon to accept the purchase amount, a selectable icon to decline the purchase amount, or a selectable icon to edit the purchase amount. In some instances, execution of the instructions can also cause the mobile computing device to instruct the card reader to not process the credit card based on a customer selection or interaction with the selectable icon to decline the purchase amount. In some other instances, execution of the instructions can also cause the mobile computing device to instruct the card reader to modify the purchase amount based on a customer selection or interaction with the selectable icon to edit the purchase amount.

Another innovative aspect of the subject matter described in this disclosure can be implemented in an apparatus for processing transactions. The apparatus can include means for receiving a payment request identifying a sales transaction between a merchant and a customer, the payment request indicating a purchase amount owed by the customer to the merchant and carrying a set of instructions; means for activating a card reader based at least in part on the received set of instructions; means for receiving customer authorization for electronic payment of the purchase amount; means for instructing the card reader to process a credit card for the purchase amount based on receiving the customer authorization; and means for receiving confirmation of payment of the purchase amount from the card reader. In some implementations, the payment request can be received from a payment processing system associated with the merchant, and the apparatus can also include means for sending the payment confirmation to the payment processing system. The set of instructions can be carried in a push notification configured to launch a mobile payment application residing on the apparatus. In some instances, the card reader can be activated by executing the mobile payment application, and transmitting an activation signal and the payment amount to the card reader. In some other instances, the apparatus can also include means for prompting the customer to insert the credit card into the card reader by presenting an alert or notification on a touch-sensitive display of the mobile computing device.

In some implementations, the apparatus can receive the customer authorization by presenting a notification of the purchase amount to the customer on a touch-sensitive display, and receiving customer input indicating acceptance of the purchase amount via the touch-sensitive display. The notification can include one or more of a selectable icon to accept the purchase amount, a selectable icon to decline the purchase amount, or a selectable icon to edit the purchase amount. In some instances, the apparatus can also include means for instructing the card reader to not process the credit card based on a customer selection or interaction with the selectable icon to decline the purchase amount. In some other instances, the apparatus can also include means for instructing the card reader to modify the purchase amount based on a customer selection or interaction with the selectable icon to edit the purchase amount.

Another innovative aspect of the subject matter described in this disclosure can be implemented in a non-transitory computer-readable memory. The non-transitory computer-readable memory can store instructions that, when executed by one or more processors of a mobile computing device, cause the mobile computing device to perform operations including receiving a payment request identifying a sales transaction between a merchant and a customer, the payment request indicating a purchase amount owed by the customer to the merchant and carrying a set of instructions; activating a card reader based at least in part on the received set of instructions; receiving customer authorization for electronic payment of the purchase amount; instructing the card reader to process a credit card for the purchase amount based on receiving the customer authorization; and receiving confirmation of payment of the purchase amount from the card reader.

In some implementations, the payment request can be received from a payment processing system associated with the merchant, and execution of the instructions can also cause the mobile computing device to send the payment confirmation to the payment processing system. The set of instructions can be carried in a push notification configured to launch a mobile payment application residing on the mobile computing device. In some instances, the card reader can be activated by executing the mobile payment application using one or more processors of the mobile computing device, and transmitting an activation signal and the payment amount to the card reader using one or more transceivers of the mobile computing device. In some other instances, execution of the instructions can also cause the mobile computing device to prompt the customer to insert the credit card into the card reader by presenting an alert or notification on a touch-sensitive display.

In some implementations, the mobile computing device can receive the customer authorization by presenting a notification of the purchase amount to the customer on a touch-sensitive display of the mobile computing device, and receiving customer input indicating acceptance of the purchase amount via the touch-sensitive display. The notification can include one or more of a selectable icon to accept the purchase amount, a selectable icon to decline the purchase amount, or a selectable icon to edit the purchase amount. In some instances, execution of the instructions can also cause the mobile computing device to instruct the card reader to not process the credit card based on a customer selection or interaction with the selectable icon to decline the purchase amount. In some other instances, execution of the instructions can also cause the mobile computing device to instruct the card reader to modify the purchase amount based on a customer selection or interaction with the selectable icon to edit the purchase amount.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIGS. 4A-4D show example screenshots depicting notifications presented on a merchant's mobile computing device, according to some implementations.

Like reference numbers and designations in the various drawings indicate like elements.

DETAILED DESCRIPTION

Figure 1:
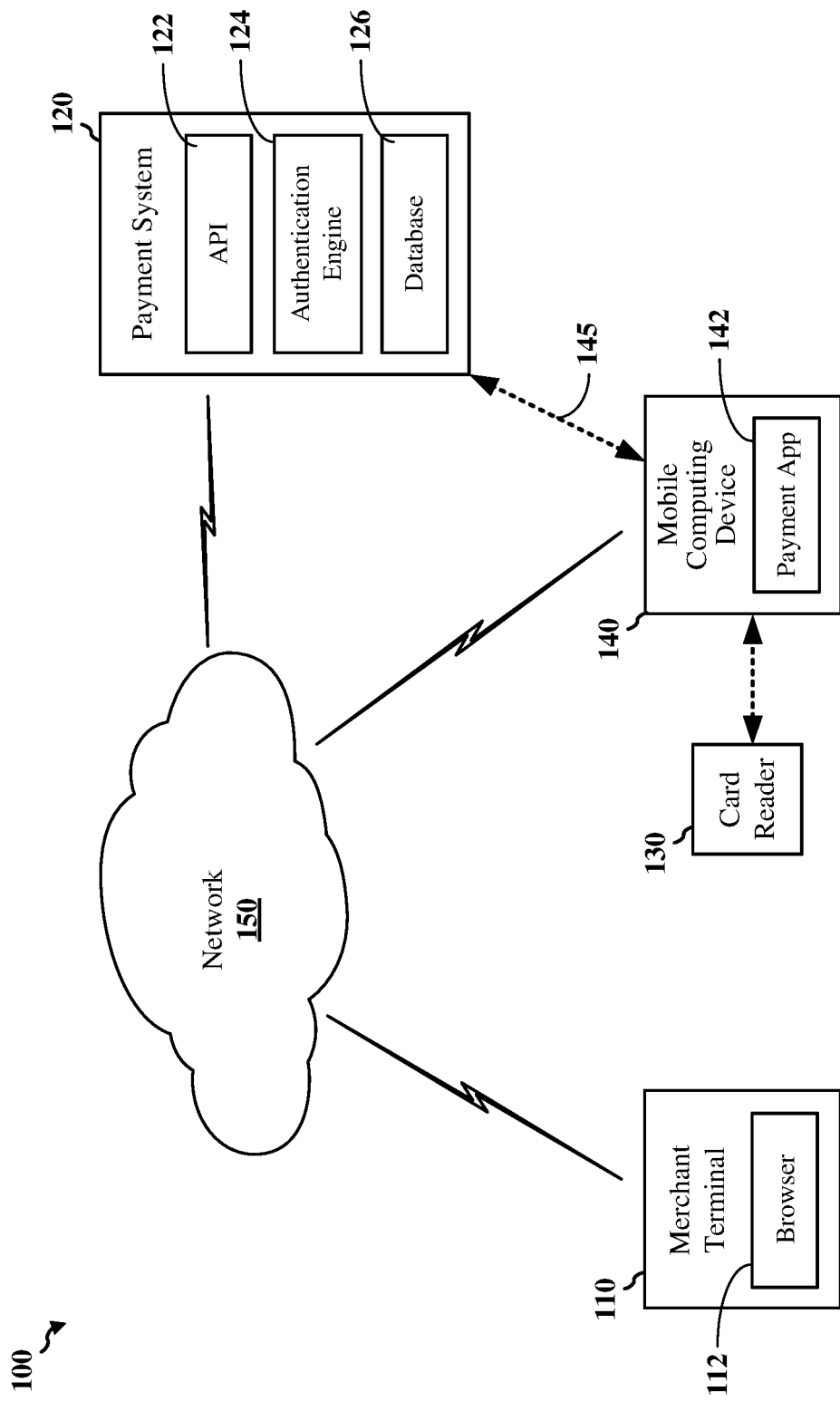
FIG. 1 shows a block diagram of an environment within which various aspects of the subject matter disclosed herein may be implemented.

The following description is directed to certain implementations for the purposes of describing the innovative aspects of this disclosure. However, a person having ordinary skill in the art will readily recognize that the teachings herein can be applied in a multitude of different ways. It may be readily understood that certain aspects of the disclosed systems and methods can be arranged and combined in a wide variety of different configurations, all of which are contemplated herein. Although described herein with respect to a particular payment processing system, various aspects of the subject matter disclosed herein are equally applicable to other electronic or online accounting and payment platforms.

Implementations of the subject matter described in this disclosure can be used to process payments associated with customer purchases of goods and/or services from a merchant. In some implementations, a payment processing system can receive a payment request from a merchant for a customer purchase, and can transmit payment information to a mobile computing device associated with the merchant. In some instances, the payment request can be received from a generic web browser executing on a computing device of the merchant, the generic web browser agnostic of an operating system of the merchant's computing device. The payment information can include a transaction identifier (ID) uniquely identifying the purchase, an amount of the purchase, and instructions that can be executed by a mobile payment app residing on the mobile computing device to activate a card reader, to send the payment information to the card reader, and to present one or more notifications on a display of the merchant's mobile computing device. In some aspects, the notification can include one or more of a selectable icon to accept the purchase amount, a selectable icon to decline the purchase amount, or a selectable icon to edit the purchase amount. The card reader can be configured to process the electronic payment only if the customer selects or interacts with the selectable icon to accept the purchase amount.

Implementations of the subject matter disclosed herein are not an abstract idea such as organizing human activity or a mental process that can be performed in the human mind, for example, because the human is not capable of wirelessly activating a card reader, is not capable of presenting push notifications on a mobile computing device, and is not capable of wirelessly approving a payment request. Moreover, various aspects of the present disclosure effect an improvement in the technical field of electronic payment services by allowing a merchant to access a web-based accounting solution (such as QuickBooks Online) using a generic browser application, and use the web-based accounting solution to send a push notification to a merchant's mobile computing device, which launches a mobile payment app (such as GoPayment) residing on the merchant's mobile computing device. The mobile payment app can activate a card reader, send payment information to the card reader, modify the payment information sent to the card reader, and receive credit card account information from the card reader. In this way, web-based online accounting software packages (such as QuickBooks Online) can utilize push notifications to process payments.

Further, although various aspects of the present disclosure are described herein with reference to a mobile computing device associated with the merchant, in some other implementations, the mobile computing device can be associated with the customer. That is, rather than transmitting payment information to a mobile device controlled by the merchant, the payment processing system can send the payment information to a mobile device controlled by the customer, and the customer can activate the card reader, present notifications on the display, and authorize the card reader to process an electronic payment for customer purchases.

In the following description, numerous specific details are set forth such as examples of specific components, circuits, and processes to provide a thorough understanding of the present disclosure. The term "coupled" as used herein means connected directly to or connected through one or more intervening components or circuits. The terms "processing system" and "processing device" may be used interchangeably to refer to any system capable of electronically processing information. Also, in the following description and for purposes of explanation, specific nomenclature is set forth to provide a thorough understanding of the aspects of the disclosure. However, it will be apparent to one skilled in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing, and other symbolic representations of operations on data bits within a computer memory.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. Also, the example input devices may include components other than those shown, including well-known components such as a processor, memory, and the like.

Several aspects of electronic payment services will now be presented with reference to various apparatus and methods. These apparatus and methods will be described in the following detailed description and illustrated in the accompanying drawings by various blocks, components, circuits, devices, processes, algorithms, and the like (collectively referred to herein as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows an environment 100 within which aspects of the present disclosure can be implemented. The environment 100 is shown to include a merchant terminal 110, a payment processing system 120, a card reader 130, a mobile computing device 140, and a communications network 150. In some implementations, the environment 100 may include any suitable number of merchant terminals 110 through which merchants can initiate electronic payment requests for purchases made by customers, and may include any suitable number of card readers 130. In addition, or in the alternative, the environment 100 may include other components, devices, or systems not shown for simplicity.

The merchant terminal 110 can be any point-of-sale (POS) terminal, desktop computer, laptop computer, tablet computer, smartphone, or other computing device capable of executing a generic browser application through which a merchant can initiate an electronic transaction for payment of a customer purchase of goods and/or services from the merchant. More specifically, the merchant can use the generic browser operating on the merchant terminal 110 to access the payment processing system 120, upload information pertaining to the customer purchase, and use the payment processing system 120 to send a payment request as one or more push notifications to the merchant's mobile computing device 140. In some instances, the merchant can use the generic browser to access Quickbooks Online, which can process the transaction information received from the merchant and send the payment request to the merchant's mobile computing device 140. The payment request can include the payment amount of the customer purchase, a transaction ID that uniquely identifies the customer purchase, and instructions for the mobile computing device 140 to activate and communicate with the card reader 130. In some instances, the payment request can be sent to the merchant's mobile computing device 140 as one or more push notifications that can be presented to the customer on a display of the mobile computing device 140. The merchant terminal 110 can also receive a confirmation that payment for the customer transaction was successfully processed (or alternatively that the payment request failed). In some instances, the merchant can receive the payment confirmation through the generic browser while connected to the payment processing system 120.

The payment processing system 120 can be implemented with, or may include, a plurality of servers of various types such as, for example, a web server, a file server, an application server, a database server, a proxy server, or any other server suitable for performing functions or processes described herein, or any combination thereof. Each server may be a unitary server or a distributed server spanning multiple computers or multiple datacenters, and may include hardware, software, or embedded logic components or a combination of two or more such components for carrying out the appropriate functionalities implemented or supported by the server. In some implementations, the payment processing system 120 can be transparent to the merchant and the consumer. For example, the payment processing system 120 can allow the merchant to brand the one or more push notifications in a manner consistent with an image, logo, or other indicia of the merchant.

The payment processing system 120 is shown to include an application program interface (API) 122, an authentication engine 124, and a database 126. The API 122 can provide a programmatic interface that allows the merchant terminal 110 to communicate with the merchant's mobile computing device 140 through the payment processing system 120. The programmatic interface of the API 122 can also allow a payment app 142 residing on the merchant's mobile computing device 140 to communicate with the merchant terminal 110 through the payment processing system 120. In some implementations, the API 122 can include, provide, or implement a merchant portal and a customer device portal. The merchant portal can be a web application, a desktop client application, a web browser, or the like through which the merchant can access the payment processing system 120 and initiate electronic payment requests associated with customer purchases from the merchant. The customer device portal can be an executable application through which the merchant's mobile computing device 140 can receive payment requests initiated by the merchant, and can provide information to the payment processing system 120. The payment request can include the purchase amount, the transaction ID, and instructions for the mobile computing device 140 to activate and communicate with the card reader 130. The customer device portal can also provide an interface through which the merchant's mobile computing device 140 can send payment confirmations to the merchant terminal 110 using the payment processing system 120. In some instances, the merchant portal can be the generic browser 112 operating on the merchant terminal 110, and the customer device portal can be the payment app 142 residing on the merchant's mobile computing device 140.

The authentication engine 124 can be used to enhance digital security in the environment 100 by protecting applications (such as Quickbooks Online) with multi-factor authentication (MFA) to verify the identities and credentials of the merchants. MFA strengthens access security by requiring multiple authentication factors or techniques to verify the identity and credentials of various system components and their associated users (such as the merchants and their respective merchant terminals 110, card readers 130, and mobile computing devices 140, and so on), and can protect against various unwanted digital attacks, including phishing, social engineering, and password brute-force attacks. The authentication engine 124 can be any suitable MFA system.

The database 126 can store information about or relating to the merchants, the customers, the merchant terminals 110, the customer mobile computing devices 140, and purchases or transactions between the merchants and the customers. In some instances, the database 126 can also store financial information of the merchants, credit card account information of the customers, configuration information for the card readers 130, push notification formats associated with different merchants, and/or other information suitable for facilitating the settlement of electronic payment requests for customer purchases initiated by the merchants. In some instances, the database 126 can be a relational database capable of manipulating any number of various data sets using relational operators, and present one or more data sets and/or manipulations of the data sets to merchants user in tabular form. The database 126 can also use Structured Query Language (SQL) for querying and maintaining the database, and information stored in the database 126 can be arranged in tabular form, either collectively in an feature table or individually within each of the data sets.

The card reader 130 can be any suitable device capable of processing credit card payments and communicating with mobile computing devices 140. In some implementations, the card reader 130 can be activated by the mobile payment app 142 residing on the merchant's mobile computing device 140, can receive a payment request from the mobile computing device 140, and can prompt the customer to insert, swipe, or tap a credit card on or near the card reader 130. The card reader 130 can obtain account information of the credit card using any suitable technique including, for example, by reading account information from physical media embedded in a magnetic strip printed on the credit card, or by retrieving the account information from a chip embedded in the credit card. In some instances, the card reader 130 can be configured to process the customer's credit card for the payment amount only after receiving approval of the payment amount from the customer. For example, the mobile payment app 142 executing on the merchant's mobile computing device 140 can present, on the display of the mobile computing device 140, a notification that includes one or more of a selectable icon to accept the purchase amount, a selectable icon to decline the purchase amount, or a selectable icon to edit the purchase amount. In this way, the customer can accept the purchase amount by touching, tapping, or otherwise interacting with the selectable accept icon, can decline the purchase amount by touching, tapping, or otherwise interacting with the selectable decline icon, or can modify the purchase amount by touching, tapping, or otherwise interacting with the selectable edit icon.

The mobile computing device 140 can be any suitable wireless communication device that can wirelessly communicate with the payment processing system 120 and the card reader 130. The mobile computing device 140 can be a laptop computer, a tablet computer, a personal digital assistant, a cellular telephone, a smartphone, an electronic book reader, or other suitable portable communications device capable of executing mobile payment app 142 and wirelessly communicating with at least the payment processing system 120 and the card reader 130. In some implementations, the mobile computing device 140 can launch the mobile payment app 142 in response to receiving a push notification containing a payment request initiated by the merchant and sent from the payment processing system 120. Once launched and executing on the mobile computing device 140, the mobile payment app 142 can activate the card reader 130, send payment information to the card reader 130, and present a notification on the display of the mobile computing device 140 indicating the pending credit card transaction initiated by the mobile payment app 142. In some instances, the mobile payment app 142 can be the GoPayment app available from Intuit, Inc.

As discussed, the notification can prompt the customer to insert, swipe, or tap a credit card on or near the card reader 130. The notification can also include one or more of a selectable icon to accept the purchase amount, a selectable icon to decline the purchase amount, or a selectable icon to edit the purchase amount. In this way, the customer can accept the purchase amount by touching, tapping, or otherwise interacting with the selectable accept icon, can decline the purchase amount by touching, tapping, or otherwise interacting with the selectable decline icon, or can modify by the purchase amount by touching, tapping, or otherwise interacting with the selectable edit icon. The mobile payment app 142 can send an indication of the customer selection to the card reader 130, which can either process the credit card payment, cancel the credit card payment, or modify the purchase amount based on input provided by the customer. The mobile computing device 140 can communicate with the card reader 130 using any suitable wireless communication protocol including, for example, cellular communications, Wi-Fi communications, Bluetooth communications, NFC communications, Zigbee communications, or infrared communications.

The mobile computing device 140 can also include a software development kit (SDK) or library that defines the interactions, communications, and functions of the card reader 130. That is, the SDK may allow the mobile computing device 140 to control various functions and operations performed by the card reader 130. The SDK can be a software module provided as a source code configuration or as a compiled binary configuration.

The network 150 provides communication links between the merchant terminals 110, the payment processing system 120, the card reader 130, and the mobile computing device 140 that allows the various components of the environment 100 to communicate with one another using wireless communications. The network 150 can be any suitable one or more communication networks including, for example, the Internet, a wide area network (WAN), a metropolitan area network (MAN), a wireless local area network (WLAN), a personal area network (PAN) such as Bluetooth®, a radio access network (RAN) such as a Fifth Generation (5G) New Radio (NR) system, a wired network, a cable network, a satellite network, or any other suitable network. In some implementations, the payment processing system 120 and the mobile device 140 can communicate with one another via a dedicated communication link 145.

Figure 2:
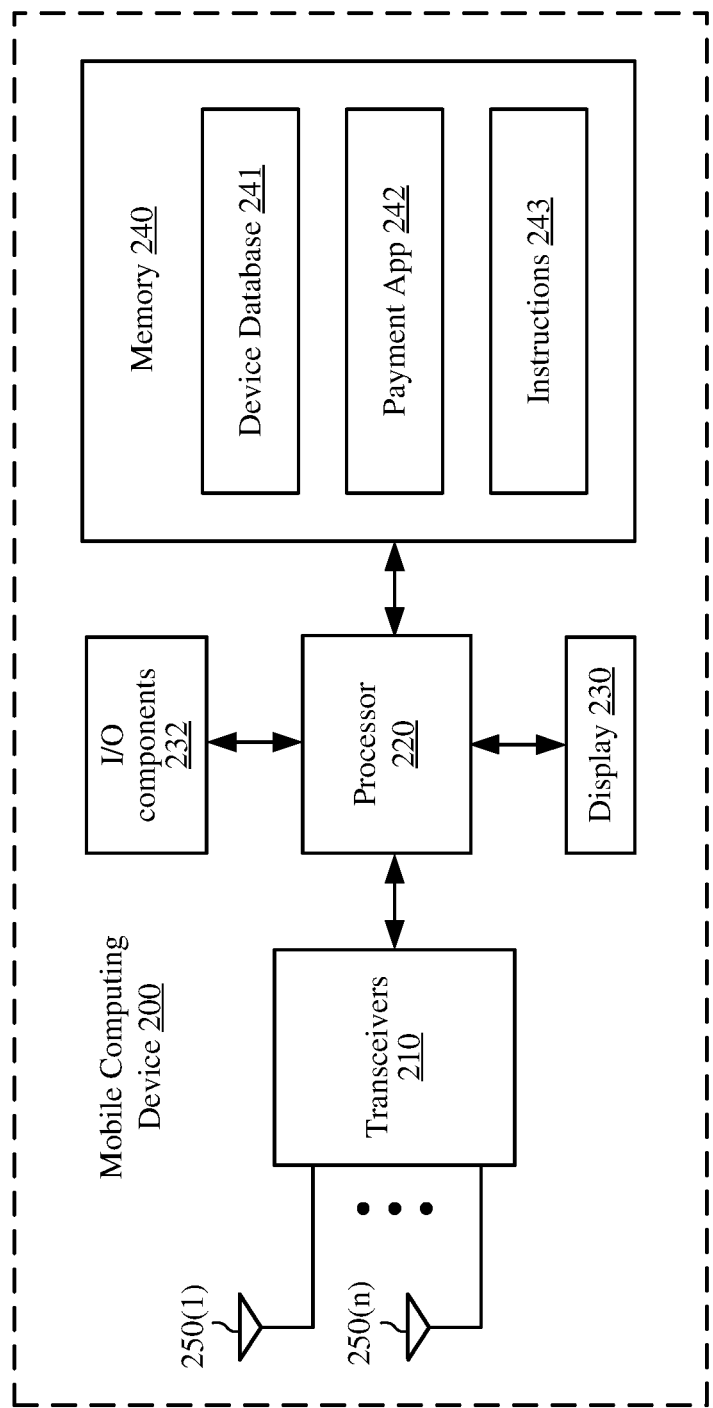
FIG. 2 shows a block diagram of a mobile computing device, according to some implementations.

FIG. 2 shows an example mobile computing device 200, according to some implementations. The mobile computing device 200, which may be one example of the mobile computing device 140 of FIG. 1, can include transceivers 210, a processor 220, a display 230, input/output (I/O) components 232, a memory 240, and a number of antennas 250(1)-250(n). The transceivers 210 may be coupled to the antennas 250(1)-250(n), either directly or through an antenna selection circuit (not shown for simplicity), and can be used to transmit signals to and receive signals from other devices. In some instances, the transceivers 210 can facilitate wireless communications between the mobile computing device 200 and each of the payment processing system 120 and the card reader 130 of FIG. 1. Although not shown in FIG. 2 for simplicity, the transceivers 210 can include any number of transmit chains to process and transmit signals to other wireless devices via the antennas 250(1)-250(n), and can include any number of receive chains to process signals received from the antennas 250(1)-250(n). A baseband processor (not shown for simplicity) can be used to process signals received from the processor 220 or the memory 240 (or both) and to forward the processed signals to the transceivers 211 for transmission via one or more of the antennas 250(1)-250(n), and can be used to process signals received from one or more of the antennas 250(1)-250(n) via the transceivers 211 and to forward the processed signals to the processor 220 or the memory 240 (or both).

The processor 220 can be any suitable one or more processors capable of executing scripts or instructions of one or more software programs stored in the mobile computing device 200 (such as within the memory 240). In some implementations, the processor 220 can be or include one or more microprocessors providing processor functionality and include external memory providing at least a portion of machine-readable media. In other implementations, the processor 220 can be or include an Application Specific Integrated Circuit (ASIC) with the processor, the bus interface, the customer interface, and at least a portion of the machine-readable media integrated into a single chip. In some other implementations, the processor 220 can be or include one or more Field Programmable Gate Arrays (FPGAs) or Programmable Logic Devices (PLDs).

The display 230 can be any suitable display or screen upon which information and selectable icons can be presented to a merchant or a customer. In some instances, the display 230 can be a touch-sensitive display that allows the merchant or the customer to control, interact with, or initiate a number of functions and operations of the mobile computing device 200 and/or the card reader 130. For example, the mobile computing device 200 can present a notification on the display 230 indicating one or more pending credit card transactions initiated by the mobile payment app 142 and processed by the card reader 130. The notification can prompt the customer to insert, swipe, or tap a credit card on or near the card reader 130, and can also include one or more of a selectable icon to accept the purchase amount, a selectable icon to decline the purchase amount, or a selectable icon to edit the purchase amount. In this way, the customer can accept the purchase amount by touching, tapping, or otherwise interacting with the selectable accept icon, can decline the purchase amount by touching, tapping, or otherwise interacting with the selectable decline icon, or can modify by the purchase amount by touching, tapping, or otherwise interacting with the selectable edit icon.

The I/O components 232 can be or include any suitable mechanism, interface, or device to receive input (such as commands) from the merchant or the customer and to provide output to the merchant or the customer. For example, the I/O components 232 may include (but are not limited to) a graphical customer interface, keyboard, mouse, microphone, speakers, and so on. In some instances, the I/O components 232 can work in conjunction with the display 230. In some other instances, the I/O components 232 can include, or can be part of, the display 230.

The memory 240 can include a device database 241 that stores profile information for the mobile computing device 200. The device database 241 can also store information suitable for facilitating financial transactions within the environment 100 such as, for example, transactions ID values, multi-factor authentication codes, card reader activation codes, and so on.

The memory 240 can also include a mobile payment app 242 that can be activated or launched based on reception of a push notification containing a payment request initiated by a merchant (such a merchant associated with the merchant terminal 110 of FIG. 1). The mobile payment app 142 can activate the card reader 130, send payment information to the card reader 130, and present a notification of pending credit card transactions on the display 230. As discussed, the notification can prompt the customer to insert, swipe, or tap a credit card on or near the card reader 130, and can include one or more of a selectable icon to accept the purchase amount, a selectable icon to decline the purchase amount, or a selectable icon to edit the purchase amount. For example, when the customer selects the selectable accept icon presented on the display 230, the mobile payment app 142 can send a payment authorization signal to the card reader 130, and the card reader 130 can process the pending credit card transaction for the purchase amount presented on the display 230. When the customer selects the selectable decline icon presented on the display 230, the mobile payment app 142 can send a payment declined signal to the card reader 130, and the card reader 130 can cancel the pending credit card transaction. When the customer selects the selectable edit icon presented on the display 230, the mobile payment app 142 can send a payment edit signal to the card reader 130, and the card reader 130 can modify the purchase amount to be charged to the customer's credit card.

The memory 240 can also include a non-transitory computer-readable medium (such as one or more nonvolatile memory elements, such as EPROM, EEPROM, Flash memory, a hard drive, and so on) that may store computer-executable instructions 243 to perform all or a portion of one or more of the operations described with reference to the sequence diagram of FIG. 3 and/or the flow chart of FIG. 5.

Figure 3:
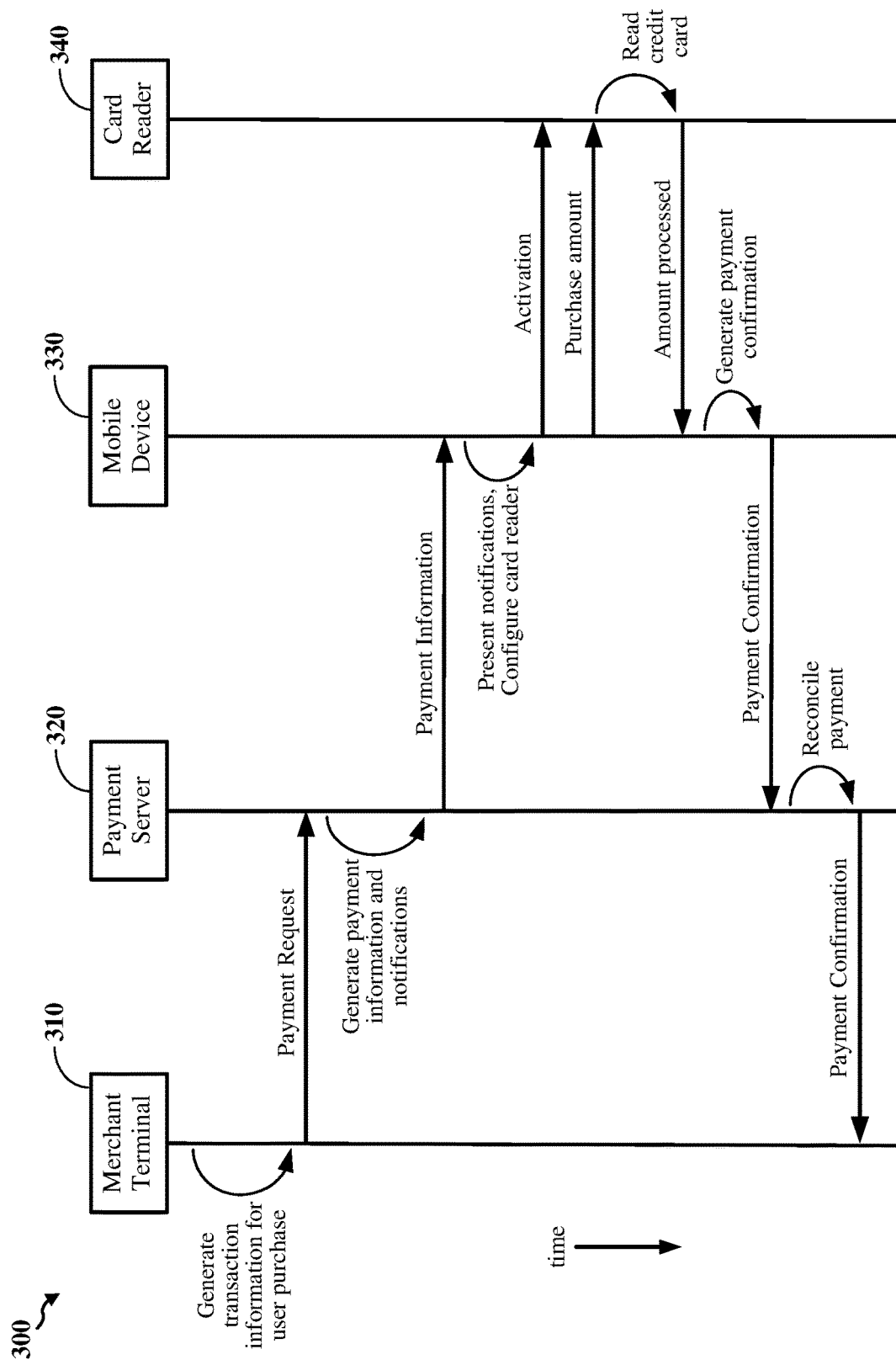
FIG. 3 shows a sequence diagram depicting operations facilitated by the payment processing system of FIG. 1, according to some implementations.
Figures 4A, 4B:
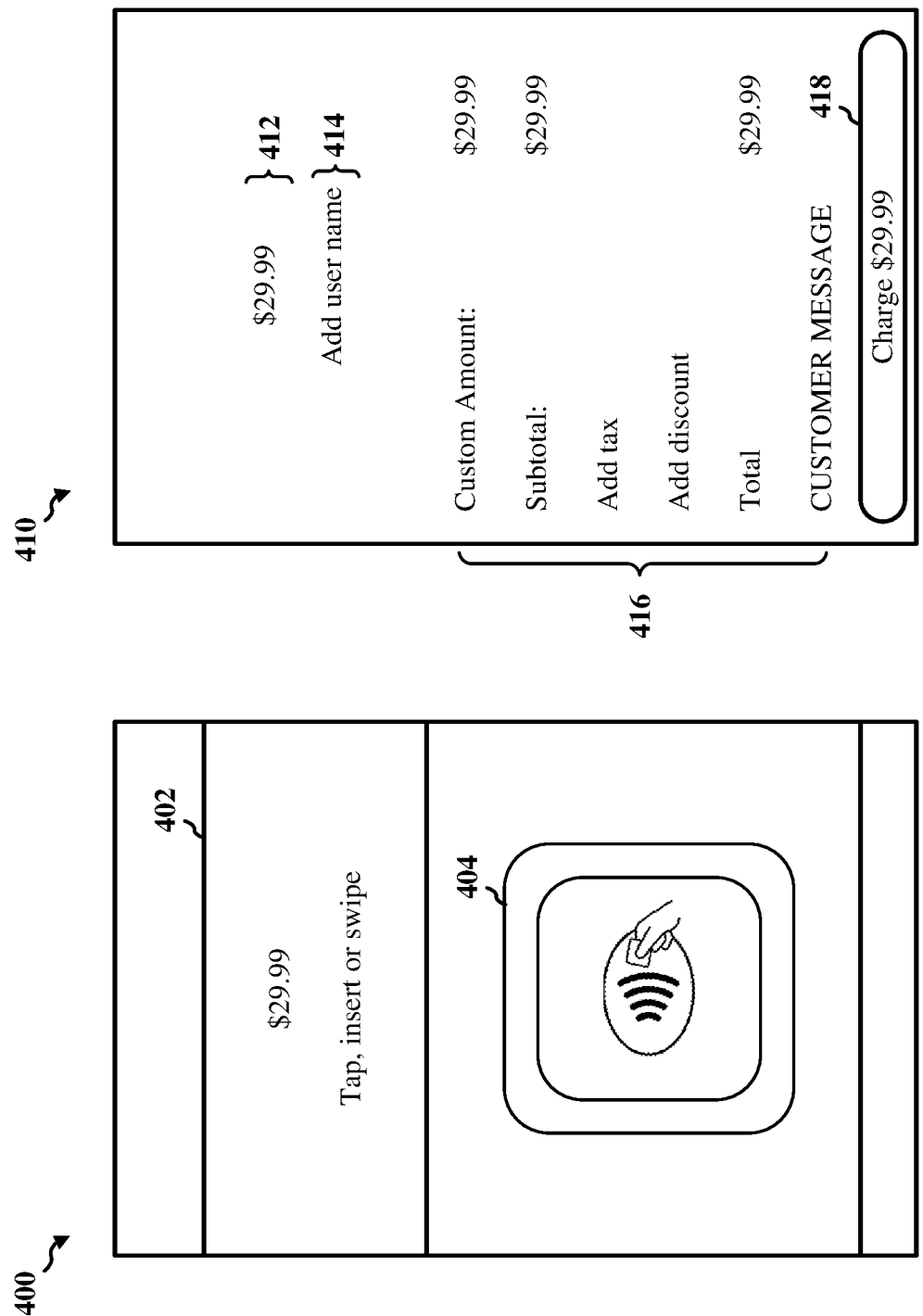

FIG. 3 shows a sequence diagram 300 depicting example operations facilitated by the payment processing system 120 of FIG. 1, according to some implementations. Upon completing a purchase of goods and/or services to a customer, a merchant can initiate an electronic payment request for the customer purchase. More specifically, the merchant can generate transaction information for the customer purchase, and use a generic browser residing on the merchant terminal 310 to access a payment server 320 associated with the payment processing system to initiate transmission of a payment request to the mobile device 330. In some instances, the payment server 320 can implement some or all of an online payment platform such as Quickbooks Online. The payment request can include the purchase amount, a transaction ID that uniquely identifies the customer purchase, and instructions for the mobile device 330 to activate and communicate with the card reader 340. In some instances, the payment request can also include a customer ID that uniquely identifies the mobile device 330.

The payment server 320 generates payment information based on the payment request received from the merchant terminal 310, and sends the payment request as one or more push notifications to the mobile device 330. The payment request can include the payment amount of the customer purchase, a transaction ID that uniquely identifies the customer purchase, and instructions for the mobile device 330 to activate and communicate with the card reader 340.

The mobile device 330, which can be an example of the mobile computing device 140 of FIG. 1 or the mobile computing device 200 of FIG. 2, receives the payment information sent by the payment server 320. In some implementations, a push notification associated with the received payment information can launch the mobile payment app residing on the mobile device 330. Once launched, the mobile payment app can activate the card reader 340, send payment information to the card reader 340, and present a notification on the display of the mobile device 330 indicating the pending credit card transaction initiated by the mobile payment app. The mobile payment app can also present a notification on the display of the mobile device 330 that prompts the customer to insert, swipe, or tap a credit card on or near the card reader 340. In some instances, the notification can also include one or more of a selectable icon to accept the purchase amount, a selectable icon to decline the purchase amount, or a selectable icon to edit the purchase amount. The customer can accept the purchase amount by touching, tapping, or otherwise interacting with the selectable accept icon, can decline the purchase amount by touching, tapping, or otherwise interacting with the selectable decline icon, or can modify by the purchase amount by touching, tapping, or otherwise interacting with the selectable edit icon. The mobile payment app can send an indication of the customer selection to the card reader 340, which can either process the credit card payment, cancel the credit card payment, or modify the purchase amount based on input provided by the customer. As discussed, in some instances, the mobile payment app can be the GoPayment app available from Intuit, Inc.

Upon activation by the mobile payment app executing on the mobile device 330, the card reader 340 can receive payment information of the customer purchase from the mobile device 330, and can obtain account information of the credit card using any suitable technique including, for example, by reading account information from physical media embedded in a magnetic strip printed on the credit card, or by retrieving the account information from a chip embedded in the credit card. The card reader 340 can prepare to process the credit card account of the customer, pending authorization or further instructions provided by the mobile payment app. In some instances, the card reader 340 can be configured to process the customer's credit card for the payment amount only after receiving approval of the payment amount from the customer. For example, the mobile payment app executing on the mobile device 330 can present, on the display of the mobile device 330, a notification that includes one or more of a selectable icon to accept the purchase amount, a selectable icon to decline the purchase amount, or a selectable icon to edit the purchase amount. In this way, the customer can accept the purchase amount by touching, tapping, or otherwise interacting with the selectable accept icon, can decline the purchase amount by touching, tapping, or otherwise interacting with the selectable decline icon, or can modify the purchase amount by touching, tapping, or otherwise interacting with the selectable edit icon.

After the card reader 340 successfully processes the payment request, the card reader 340 sends a payment confirmation and the payment amount processed to the mobile device 330, which in turn sends the payment confirmation and the processed payment amount to the payment server 320. The payment server 320 confirms payment of the payment request, and sends the payment confirmation to the merchant terminal 310. In some instances, the payment server 320 can reconcile the processed payment amount in an accounting solution (such as Quickbooks Online) associated via with the customer.

The merchant terminal 310 receives the payment confirmation from the payment server 320, and can present a notification of the payment confirmation to the merchant. In some instances, the merchant terminal 310 can receive the payment confirmation through the generic browser while connected to the payment processing system 120.

FIGS. 4A-4D illustrate screenshots of a display of a merchant's mobile computing device, according to some implementations. In some instances, the display depicted in FIGS. 4A-4D can be an example of the display 230 of the mobile computing device 200 of FIG. 2. As discussed and shown in the illustration 400 of FIG. 4A, the mobile payment app 242 can present a notification, on the display 230 of the merchant's mobile computing device 200, that includes a purchase indication icon 402 and a prompt icon 404. The purchase indication icon 402 can display the purchase amount to be charged to the customer's credit card, and the prompt icon 404 can prompt the customer to insert, swipe, or tap a credit card on or near the card reader 130. In some instances, the customer can touch or tap the purchase indication icon 402A to receive an itemized list of the purchased goods and their respective prices.

When the customer touches or taps the purchase indication icon 402, the mobile payment app 242 can present one or more selectable icons that present details of the pending customer transaction. For example, as shown in the illustration 410 of FIG. 4B, the selectable icons can include a purchase amount icon 412, a customer name icon 414, an itemized listing icon 416, and a payment completion icon 418. The purchase amount icon 412 can display the total dollar amount of the customer purchase, the customer name icon 414 can display the customer's name, the itemized listing icon 416 can display the items purchases and their respective prices, and the payment completion icon 418 can indicate completion of the customer transaction.

In some implementations, a notification can include a selectable accept icon 422, selectable decline icon 424, and a selectable edit icon 426, for example, as shown in the illustration 420 of FIG. 4C. The customer can accept the purchase amount by touching, tapping, or otherwise interacting with the selectable accept icon 422, can decline the purchase amount by touching, tapping, or otherwise interacting with the selectable decline icon 424, or can modify the purchase amount by touching, tapping, or otherwise interacting with the selectable edit icon 426. In some instances, the notification can also include a selectable review order icon 428. When the customer touches, taps, or otherwise interacts with the selectable review order icon 428, the mobile payment app 242 can allow the customer to review the customer purchase and/or make changes to the customer purchase.

After the card reader 130 has successfully processed the customer's credit card for the authorized purchase amount, the mobile payment app 242 can present a notification 432 on the display 230 of the merchant's mobile computing device 200 indicating payment confirmation of the customer purchase, for example, as shown in the illustration 430 of FIG. 4D.

Figure 5:
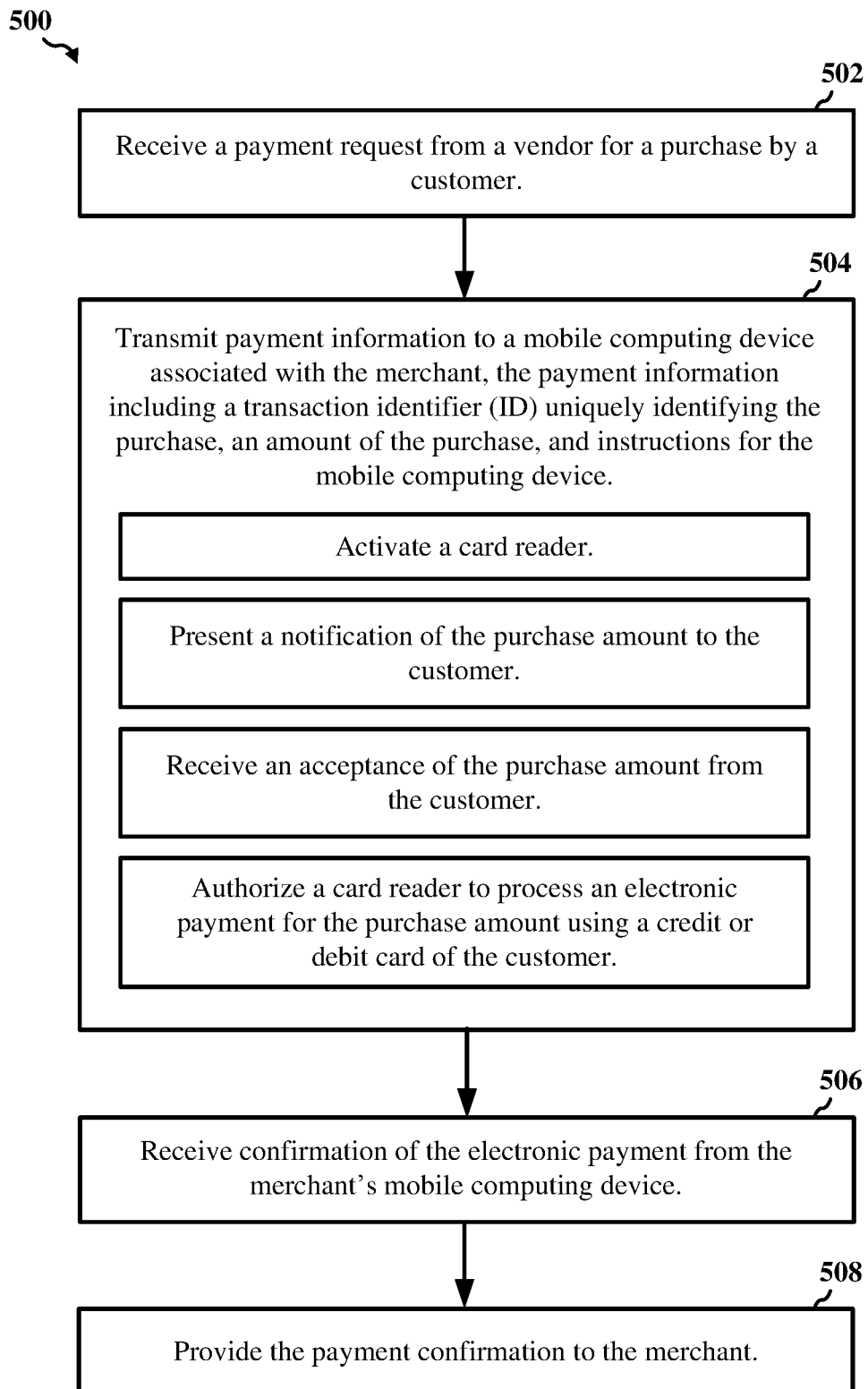
FIG. 5 shows an illustrative flowchart depicting an example operation for processing transactions, according to some implementations.

FIG. 5 shows an illustrative flowchart depicting an example operation 500 for method of processing transactions. The operation 500 may be performed by one or more processors of the payment processing system 120 of FIG. 1. In some implementations, the operation 500 may be an example of one or more of the operations depicted in the sequence diagram 300 of FIG. 3. At block 502, the system receives a payment request from a merchant for a purchase by a customer. In some instances, the payment request can be received from a web browser executing on a computing device of the merchant. For example, the merchant may sell goods or services to the customer, and can use a web browser executing on a suitable computing device (such as a personal computer, a laptop, or tablet computer) to login to or other otherwise communicate with the payment processing system. In some instances, the web browser is device-agnostic, OS-agnostic, and platform-agnostic.

At block 504, the system transmits payment information to a mobile computing device associated with the merchant. The payment information includes a transaction identifier (ID) that uniquely identifies the purchase and includes the purchase amount. The payment information can also carry instructions that cause the mobile computing device to present a notification of the purchase amount to the customer. In some instances, the notification is a push notification presented on a display screen of the merchant's mobile computing device. The push notification can include a first selectable icon to accept the purchase amount, a second selectable icon to decline the purchase amount, and/or a third selectable icon to edit the purchase amount. For example, the first selectable icon can be touched, pressed, or otherwise interacted with by the customer to accept the purchase amount, the second selectable icon can be touched, pressed, or otherwise interacted with by the customer to decline the purchase amount, and the third selectable icon can be touched, pressed, or otherwise interacted with by the customer to edit the purchase amount. In addition, or in the alternative, the push notification can include another selectable icon that can be touched, pressed, or otherwise interacted with by the customer to add an additional amount such as, for example, a gratuity, to the payment amount.

The instructions carried in the payment information can also instruct the merchant's mobile computing device (via the mobile payment app) to receive an acceptance or a declination of the purchase amount from the customer, and to activate a card reader to process an electronic payment for the purchase amount based on the customer's acceptance. For example, in response to the customer touching or selecting an accept icon, the mobile computing device can determine that the customer has accepted the purchase amount, and can authorize the card reader to process the payment request using the customer's credit card. For another example, in response to the customer touching or selecting an edit icon, the mobile computing device can modify or edit the purchase amount based, for example, on additional input provided by the customer via the mobile computing device. For another example, in response to the customer touching or selecting a decline icon, the mobile computing device can cause the card reader to cancel the transaction.

At block 506, the system receives confirmation of the electronic payment from the merchant's mobile computing device. In some instances, the payment processing system can pull the payment information from the card reader using the mobile computing device.

At block 508, the system provides the payment confirmation to the merchant. In some instances, the system can present a merchant notification in the web browser executing on the merchant's computing device. In some other instances, the can present a pop-up notification, a dismissal notification, or any other suitable type of temporary notification that informs the merchant of the final status and information of the transaction. For example, the notification can indicate whether the transaction was successfully completed, the final purchase amount, the total amount collected, the type of payment or credit card of the customer, and the like. In some instances, the notification can also indicate, or at least include, the transaction ID of the transaction. In some instances, the merchant notification is agnostic of a type of browser or a type of operating system of the merchant's computing device, for example, such that the delivery, presentation, and/or visual aspects remain the same or at least substantially similar irrespective of whether the merchant is using an Ipad®, a Surface® tablet, a Windows® machine, a LINUX operating system, and so on.

Figure 6:
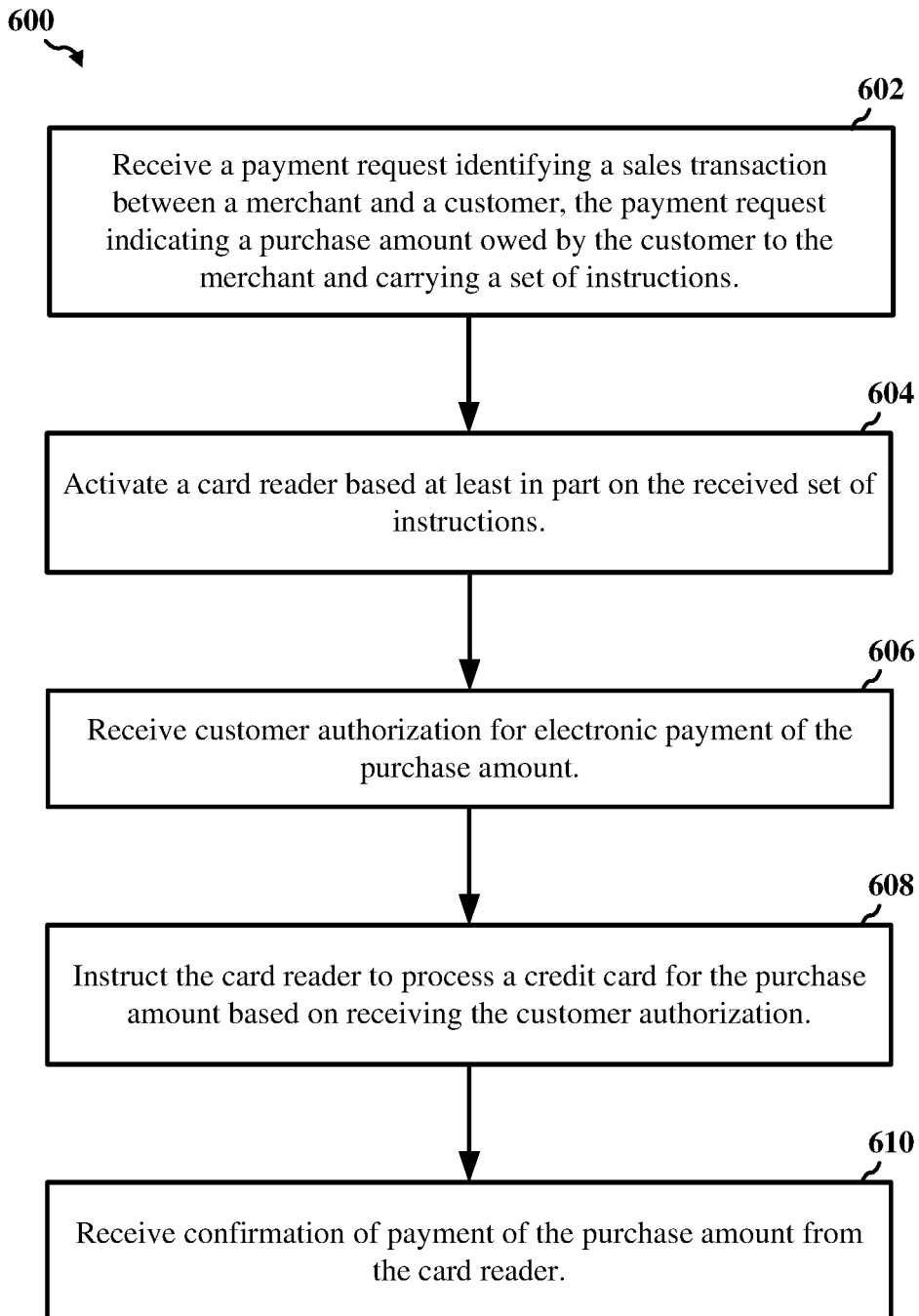
FIG. 6 shows an illustrative flowchart depicting an example operation for processing transactions, according to some other implementations.

FIG. 6 shows an illustrative flowchart depicting an example operation 600 for processing transactions, according to some other implementations. The operation 600 may be performed by one or more processors of the mobile computing device 200 of FIG. 2. In some instances, the operation 600 may be an example of one or more of the operations depicted in the sequence diagram 300 of FIG. 3. At block 602, the mobile computing device receives a payment request identifying a sales transaction between a merchant and a customer, the payment request indicating a purchase amount owed by the customer to the merchant and carrying a set of instructions. In some instances, the payment request can be received from a payment processing system associated with the merchant. For example, the merchant may sell goods or services to the customer, and can use a web browser executing on a suitable computing device (such as a personal computer, a laptop, or tablet computer) to login to or other otherwise communicate with the payment processing system. The payment processing system can generate a transaction ID that uniquely identifies the transaction, and can send the transaction ID along with the payment request to the mobile computing device.

At block 604, the mobile computing device activates a card reader based at least in part on the received set of instructions. In some instances, the card reader can be activated by a mobile payment application executing on the mobile computing device. The mobile payment application can be, for example, the GoPayment app available from Intuit, Inc., and the set of instructions can be configured for execution by the mobile payment application. In some instances, the set of instructions can be carried in a push notification that, when received by the mobile computing device, causes the mobile computing device to launch the mobile payment application.

At block 606, the mobile computing device receives customer authorization for electronic payment of the purchase amount. In some instances, the mobile computing device can receive the customer authorization by presenting a notification of the purchase amount to the customer on a touch-sensitive display of the mobile computing device, and then receiving customer input indicating acceptance of the purchase amount via the touch-sensitive display. The notification can include one or more of a selectable icon to accept the purchase amount, a selectable icon to decline the purchase amount, or a selectable icon to edit the purchase amount.

At block 608, the mobile computing device instructs the card reader to process a credit card for the purchase amount based on receiving the customer authorization. In some instances, the mobile computing device can instruct the card reader to process the credit card based on a customer selection or interaction with the selectable icon to accept the purchase amount. In other instances, the mobile computing device can instruct the card reader to not process the credit card based on a customer selection or interaction with the selectable icon to decline the purchase amount. In some other instances, the mobile computing device can instruct the card reader to modify the purchase amount based on a customer selection or interaction with the selectable icon to edit the purchase amount.

At block 610, the mobile computing device receives confirmation of payment of the purchase amount from the card reader. In some instances, the mobile computing device can send the payment confirmation to the payment processing system. As discussed above, the payment processing system can send a confirmation that payment for the customer transaction was successfully processed (or alternatively that the payment request failed) to the merchant terminal. In some instances, the merchant can receive the payment confirmation through the generic browser while connected to the payment processing system.

In some implementations, the mobile computing device can also prompt the customer to insert the credit card into the card reader by presenting an alert or notification on the touch-sensitive display.

Figure 7A:
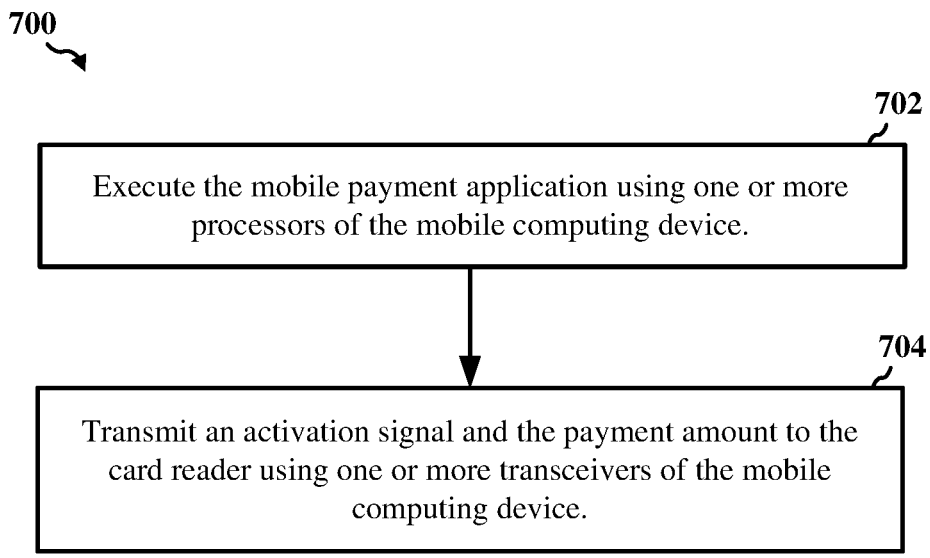
FIGS. 7A-7B show illustrative flowcharts depicting example operations for processing transactions, according to some other implementations.

FIG. 7A shows an illustrative flowchart depicting an example operation 700 for processing transactions, according to some other implementations. The operation 700 may be performed by one or more processors of the mobile computing device 200 of FIG. 2. In some implementations, the operation 700 may be one example of activating the card reader in block 604 of FIG. 6. In some instances, the operation 700 may be an example of one or more of the operations depicted in the sequence diagram 300 of FIG. 3. At block 702, the mobile computing device executes the mobile payment application. At block 704, the mobile computing device transmits an activation signal and the payment amount to the card reader.

The card reader can obtain account information of the credit card using any suitable technique including, for example, by reading account information from physical media embedded in a magnetic strip printed on the credit card, or by retrieving the account information from a chip embedded in the credit card. In some instances, the card reader can be configured to process the customer's credit card for the payment amount only after receiving approval of the payment amount from the customer.

Figure 7B:
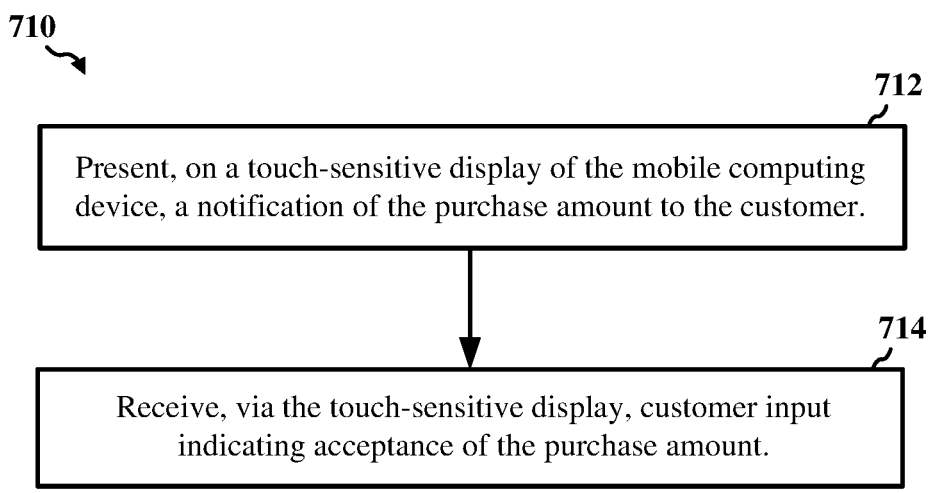

FIG. 7B shows an illustrative flowchart depicting an example operation 710 for processing transactions, according to some other implementations. The operation 710 may be performed by one or more processors of the mobile computing device 200 of FIG. 2. In some implementations, the operation 710 may be one example of receiving customer authorization in block 606 of FIG. 6. In some instances, the operation 710 may be an example of one or more of the operations depicted in the sequence diagram 300 of FIG. 3. At block 712, the mobile computing device presents a notification of the purchase amount to the customer on a touch-sensitive display of the mobile computing device. At block 714, the mobile computing device receives customer input indicating acceptance of the purchase amount via the touch-sensitive display.

As discussed above, the notification can also include one or more of a selectable icon to accept the purchase amount, a selectable icon to decline the purchase amount, or a selectable icon to edit the purchase amount. The customer can accept the purchase amount by touching, tapping, or otherwise interacting with the selectable accept icon, can decline the purchase amount by touching, tapping, or otherwise interacting with the selectable decline icon, or can modify by the purchase amount by touching, tapping, or otherwise interacting with the selectable edit icon. The mobile payment app can send an indication of the customer selection to the card reader, which can either process the credit card payment, cancel the credit card payment, or modify the purchase amount based on input provided by the customer.

As used herein, a phrase referring to "at least one of" a list of items refers to any combination of those items, including single members. As an example, "at least one of: a, b, or c" is intended to cover: a, b, c, a-b, a-c, b-c, and a-b-c.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

What is claimed is:

1. A method performed by one or more processors of a mobile computing device associated with a customer, the method comprising:
   receiving, from an online system over a wireless communication network, a push notification including a payment request and a set of instructions for activating a card reader using a mobile payment app residing on the mobile computing device, the payment request identifying a purchase from a merchant and a purchase amount owed by the customer to the merchant;
   launching the mobile payment app using the one or more processors in response to receiving the set of instructions included in the push notification;
   activating the card reader using the mobile payment app based at least in part on the set of instructions;
   receiving, on a touch-sensitive display of the mobile computing device, customer authorization for electronic payment of the purchase amount by the card reader;
   instructing the card reader using the mobile payment app to process a credit card for the purchase amount based on receiving the customer authorization; and
   receiving a payment confirmation of the purchase amount from the card reader using the mobile payment app.

2. The method of claim 1, wherein the payment request originates from a web browser operating on a computing device associated with the merchant.

3. The method of claim 1, further comprising:
   sending the payment confirmation to the online system over the wireless communication network.

4. The method of claim 1, further comprising:
   prompting the customer to insert the credit card into the card reader by presenting an alert or notification on the touch-sensitive display of the mobile computing device.

5. The method of claim 1, wherein activating the card reader comprises:
   transmitting an activation signal and the payment amount to the card reader using one or more transceivers of the mobile computing device.

6. The method of claim 1, wherein receiving the customer authorization comprises:
   presenting, on the touch-sensitive display of the mobile computing device associated with the customer, a notification of the purchase amount to the customer; and
   receiving, via the touch-sensitive display, customer input indicating acceptance of the purchase amount.

7. The method of claim 6, wherein the notification includes one or more of a selectable icon to accept the purchase amount, a selectable icon to decline the purchase amount, or a selectable icon to edit the purchase amount.

8. The method of claim 7, further comprising:
   instructing the card reader to not process the credit card based on a customer selection or interaction with the selectable icon to decline the purchase amount.

9. The method of claim 7, further comprising:
   instructing the card reader to modify the purchase amount based on a customer selection or interaction with the selectable icon to edit the purchase amount.

10. A mobile computing device associated with a customer, the mobile computing device comprising:
    a touch-sensitive display;
    one or more transceivers;
    one or more processors coupled to the one or more transceivers and the touch-sensitive display; and
    a memory coupled to the one or more processors and the touch-sensitive display, the memory storing instructions that, when executed by the one or more processors, causes the mobile computing device to:
      receive, from an online system over a wireless communication network, a push notification including a payment request and a set of instructions for activating a card reader using a mobile payment app residing on the mobile computing device, the payment request identifying a purchase from a merchant and a purchase amount owed by the customer to the merchant;
      launch the mobile payment app using the one or more processors in response to receiving the set of instructions included in the push notification;
      activate the card reader using the mobile payment app based at least in part on the set of instructions included in the push notification;
      receive, on the touch-sensitive display of the mobile computing device, customer authorization for electronic payment of the purchase amount via the card reader;
      instruct the card reader using the mobile payment app to process a credit card for the purchase amount based on receiving the customer authorization; and
      receive a payment confirmation of the purchase amount from the card reader using the mobile payment app.

11. The mobile computing device of claim 10, wherein the payment request originates from a web browser operating on a computing device associated with the merchant.

12. The mobile computing device of claim 10, wherein execution of the instructions further causes the mobile computing device to:

send the payment confirmation to the online system over the wireless communication network.

13. The mobile computing device of claim 10, wherein execution of the set of instructions causes the mobile payment app to:

prompt the customer to insert the credit card into the card reader by presenting an alert or notification on the touch-sensitive display of the mobile computing device.

14. The mobile computing device of claim 10, wherein execution of the set of instructions causes the mobile payment app to:

transmit an activation signal and the payment amount to the card reader using the one or more transceivers.

15. The mobile computing device of claim 10, wherein execution of the set of instructions causes the mobile payment app to:

present, on the touch-sensitive display of the mobile computing device associated with the customer, a notification of the purchase amount to the customer; and receive, via the touch-sensitive display, customer input indicating acceptance of the purchase amount.

16. The mobile computing device of claim 15, wherein the notification includes one or more of a selectable icon to accept the purchase amount, a selectable icon to decline the purchase amount, or a selectable icon to edit the purchase amount.

17. The mobile computing device of claim 16, wherein execution of the set of instructions causes the mobile payment app to:

instruct the card reader to not process the credit card based on a customer selection or interaction with the selectable icon to decline the purchase amount.

18. The mobile computing device of claim 16, wherein execution of the set of instructions causes the mobile payment app to:

instruct the card reader to modify the purchase amount based on a customer selection or interaction with the selectable icon to edit the purchase amount.

* * * * *